United States Patent
Yoshioka et al.

(10) Patent No.: US 9,481,146 B2
(45) Date of Patent: Nov. 1, 2016

(54) CROSSLINKED POLYOLEFIN RESIN FOAM

(75) Inventors: Takahide Yoshioka, Otsu (JP); Hitoshi Yasuzawa, Otsu (JP)

(73) Assignee: Toray Industries, Inc. (JP)

( * ) Notice: Subject to any disclaimer, the term of this patent is extended or adjusted under 35 U.S.C. 154(b) by 695 days.

(21) Appl. No.: 14/003,921

(22) PCT Filed: Feb. 1, 2012

(86) PCT No.: PCT/JP2012/052220
§ 371 (c)(1),
(2), (4) Date: Sep. 9, 2013

(87) PCT Pub. No.: WO2012/120944
PCT Pub. Date: Sep. 13, 2012

(65) Prior Publication Data
US 2013/0344311 A1 Dec. 26, 2013

(30) Foreign Application Priority Data
Mar. 9, 2011 (JP) ................ 2011-051118

(51) Int. Cl.
*B32B 5/32* (2006.01)
*B32B 27/06* (2006.01)
*C08J 9/00* (2006.01)
*C08J 9/10* (2006.01)
*C08L 23/08* (2006.01)

(52) U.S. Cl.
CPC ............... *B32B 5/32* (2013.01); *B32B 27/065* (2013.01); *C08J 9/0061* (2013.01); *C08J 9/0066* (2013.01); *C08J 9/103* (2013.01); *C08L 23/0815* (2013.01); *C08J 2201/026* (2013.01); *C08J 2323/02* (2013.01); *C08J 2323/04* (2013.01); *C08J 2423/04* (2013.01); *Y10T 428/24983* (2015.01)

(58) Field of Classification Search
CPC ........ B32B 5/32; C08J 9/0066; C08J 9/0061
See application file for complete search history.

(56) References Cited

FOREIGN PATENT DOCUMENTS

| JP | 55-142328 | 10/1980 |
|---|---|---|
| JP | 5-48775 | 7/1993 |
| JP | 06-025380 | 2/1994 |
| JP | 06-065410 | 3/1994 |
| JP | 07-048468 | 2/1995 |
| JP | 07-109369 | 4/1995 |
| JP | B-07-68396 | 7/1995 |
| JP | 11-279315 | 10/1999 |
| JP | 2001-098101 | 4/2001 |
| JP | 2011-052044 | 3/2011 |
| WO | 2006/043570 | 4/2006 |

*Primary Examiner* — Hai Vo
(74) *Attorney, Agent, or Firm* — DLA Piper LLP (US)

(57) ABSTRACT

A crosslinked polyolefin resin foam, wherein a C4-12 α-olefin-copolymerized, linear, low-density polyethylene resin (Y) and a low-density polyethylene resin (X) other than the resin (Y), the content of the resin (X) is lower than that of the resin (Y); the sum of (X) and (Y) is 50% or more and 100% or less based on 100% of all components; 50% compressive hardness is 70 kPa or less; when the foam is divided in the thickness direction into equal four layers (A), (B), (C) and (D) in this order from one face side of the foam, and 50% compressive hardnesses of layers (A) and (D) are "compressive hardness (a)" and "compressive hardness (d)," respectively, the ratio of (a) to (d) is 1/20 to 1/2; and air permeability in the thickness direction is less than 0.9 L/min.

7 Claims, No Drawings

CROSSLINKED POLYOLEFIN RESIN FOAM

TECHNICAL FIELD

This disclosure relates to a crosslinked polyolefin resin foam which is flexible and exhibits excellent sealing properties.

BACKGROUND

Rubber foams have excellent cushioning properties and therefore are useful for such applications as cushioning materials and padding materials. As well known, in comparison between closed cells and continuous cells in foam structures, the former has a structure having cells separated in a steric lattice form by partitions and the latter has a structure in which partitions located between a series of cells separated by the partitions of the closed cell structure are removed; the latter can be deformed dynamically more easily. However, although the effect of water blocking and air sealing is out of the question for continuous cells, closed cells are expected to have the effect of water blocking and air sealing due to the presence of partitions between the cells, but a foam with closed cells hardly conforms to gaps because it hardly deforms dynamically due to its high facial pressure. As a solution, it is known to use a water-swellable polymer foam as a sealing material for tunneling work or work of water and sewage construction and a water-blocking material for engineering and architecture work, many proposals regarding the composition and the production method of such water-swellable polymer foams have been made (see JP-A-6-65410, JP-A-6-25380, JP-A-7-109369, JP-B-5-48775 and JP-B-7-68396).

A technology involving passing an item through a gap between a pair of rolls rotating in the same direction to apply a compression force and a shearing force simultaneously has also been proposed (see WO 2006/043570 A1).

Sealing materials made of the water-swellable polymer foams disclosed in JP '410, JP '380, JP '369, JP '775 and JP '396 are insufficient in initial sealing properties to be exerted after coming into contact with water and until the sealing effect due to water-swellability is exhibited completely. If a foam mainly containing closed cells is used to satisfy the initial sealing properties, not only the sealing effect due to water-swellability fails to be exhibited satisfactorily, but also it becomes difficult to install the foam into a complicated gap due to its low deformability.

The above-described foam disclosed in WO '570 is economically disadvantageous because of the use of a method in which a crosslinked polyolefin resin foam sheet is produced by a publicly known and used process and then the sheet is processed by subsequent processing, and the foam is insufficient also in terms of the sealing properties at the time of being used as a sealing material.

In view of such background of the existing technologies, it could be helpful to provide a crosslinked polyolefin resin foam which is flexible and exhibits excellent sealing properties.

SUMMARY

We thus provide:

(1) a crosslinked polyolefin resin foam, wherein when a $C_{4-12}$ α-olefin-copolymerized, linear, low-density polyethylene resin is referred to as "a resin (Y)," and a low-density polyethylene resin other than the resin (Y) is referred to as "a resin (X)," the content of the resin (X) is lower than that of the resin (Y); the sum total of the resin (X) and the resin (Y) is 50% by mass or more and 100% by mass or less based on 100% by mass of all the components of the foam; the 50% compressive hardness is 70 kPa or less; when the foam is divided in the thickness direction into equal four parts, namely, a foam layer (A), a foam layer (B), a foam layer (C) and a foam layer (D) in this order from one face side of the foam, and the 50% compressive hardness of the foam layer (A) and that of the foam layer (D) are referred to as "compressive hardness (a)" and "compressive hardness (d)," respectively, the ratio of the compressive hardness (a) to the compressive hardness (d) is 1/20 to 1/2; and the air permeability in the thickness direction is less than 0.9 L/min, (2) the crosslinked polyolefin resin foam according to (1), wherein the content of the resin (X) is 20% by mass or more and 45% by mass or less and the content of the resin (Y) is 55% by mass or more and 80% by mass or less where the sum total of the contents of the resin (X) and the resin (Y) is taken as 100% by mass, (3) the crosslinked polyolefin resin foam according to (1) or (2), the foam comprising iron oxide and/or mica, (4) the crosslinked polyolefin resin foam according to any one of (1) to (3), wherein when the 50% compressive hardness of the foam layer (B) is referred to as "compressive hardness (b)," the magnitude of the compressive hardness is in the order of the compressive hardness (a)<the compressive hardness (b)<the compressive hardness (d), (5) the crosslinked polyolefin resin foam according to any one of (1) to (4), wherein the apparent density of the foam is within the range of from 0.015 to 0.033 g/cm$^3$.

It is possible to provide a crosslinked polyolefin resin foam which is flexible and exhibits excellent sealing properties.

DETAILED DESCRIPTION

Our crosslinked polyolefin resin foams are flexible and exhibit excellent sealing properties. The foams are described in detail below.

The crosslinked polyolefin resin foam is characterized in that the 50% compressive hardness thereof (measured in accordance with JIS K6767 (1999) "Foamed Plastic—Polyethylene—Test Method") is 70 kPa or less. If the 50% compressive hardness of the crosslinked polyolefin resin foam is larger than 70 kPa, when the foam has a portion different in compression ratio from the other depending upon the shape of a mold in the use as a sealing material, such a portion may fail to seal, allowing water or air to permeate, which is not preferable. The 50% compressive hardness of the crosslinked polyolefin resin foam is more preferably 60 kPa or less, and even more preferably 45 kPa or less. The lower limit of the 50% compressive hardness of the crosslinked polyolefin resin foam is not particularly limited, but the 50% compressive hardness is preferably 15 kPa or more. When the 50% compressive hardness is lower than 15 kPa, such a crosslinked polyolefin resin foam is prone to be collapsed by tension and is uneven in thickness along its longitudinal direction when being wound up in the form of roll, which is not preferable.

The 50% compressive hardness is usually reduced by using the method of reducing the apparent density of a foam, but in the case of a crosslinked polyolefin resin foam having a closed cell structure wholly in the thickness direction, it is difficult to reduce the 50% compressive hardness to 70 kPa or less by merely reducing the apparent density.

For a foam having a closed cell structure, to set the 50% compressive hardness of the crosslinked polyolefin resin foam to 70 kPa or less, preferred is a method involving controlling the ratio of the compressive hardness (a) to the compressive hardness (d) to be 1/20 to 1/2 and further conducting the control to satisfy the relationship of the compressive hardness (a)<the compressive hardness (b)<the compressive hardness (d) as described below. The compressive hardness (a), the compressive hardness (b), and the compressive hardness (d) are described later.

Controlling the ratio of the compressive hardness (a) to the compressive hardness (d) to be 1/20 to 1/2 and further conducting the control to satisfy the relationship of the compressive hardness (a)<the compressive hardness (b)<the compressive hardness (d) is achieved by adjusting the content of the resin (X) that is higher in crosslinkability to be smaller than the content of the resin (Y) that is lower in crosslinkability and further adjusting the amount of heat of the foam layer (A) side to be larger than the amount of heat of the foam layer (D) side in the foaming step described later. This will lead to an increased tendency that the cells located on the foam layer (A) side is made continuous and form a continuous cell structure.

The crosslinked polyolefin resin foam is characterized in that when the foam is divided in the thickness direction into equal four parts, namely, a foam layer (A), a foam layer (B), a foam layer (C) and a foam layer (D) in this order from one face side of the foam, and the 50% compressive hardness (measured in accordance with JIS K6767 (1999) "Foamed Plastic—Polyethylene—Test Method") of each of the foam layers is referred to as "compressive hardness (a)," "compressive hardness (b)," "compressive hardness (c)" and "compressive hardness (d)," respectively, the ratio of the compressive hardness (a) to the compressive hardness (d), which is a ratio calculated from their values indicated, is 1/20 to 1/2.

The case that the ratio of the compressive hardness (a) to the compressive hardness (d) is larger than 1/2 is not preferable because when the crosslinked polyolefin resin foam is used as a sealing material, the ability of the foam to conform to a mold will deteriorate. The case that the ratio of the compressive hardness (a) to the compressive hardness (d) is less than 1/20 is not preferable because the crosslinked polyolefin resin foam is prone to be damaged on its surface of the foam layer (A) side. The ratio of the compressive hardness (a) to the compressive hardness (d) is more preferably 1/10 to 1/3.

It is important for the crosslinked polyolefin resin foam that the air permeability in the thickness direction is less than 0.9 L/min. The method of measuring the air permeability in the thickness direction refers to a measuring method in accordance with the method B provided in JIS K6400-7 (2004) "Flexible cellular polymeric materials—Determination of physical properties—Part 7: Air permeability" and a measured value measured with a method B air permeability tester A050 manufactured by Imoto machinery Co., Ltd. is adopted. In such a case, the criterion is that the air permeability is less than the limit of detection of the smallest manometer, that is, less than 0.9 L/min. In other words, this means that the air permeability is equal to or less than the limit value of measurement. Therefore, the lower limit of the air permeability in the thickness direction is not particularly limited, but the lower limit is 0 L/min if measurement can be conducted. 0 L/min means perfect lack in air permeability and less than 0.1 L/min is impossible in principle. Since air permeability with a value of less than 0.9 L/min is beyond the limit of detection in the present method, values of 0 L/min or more and less than 0.9 L/min can be specified only by another method. Therefore, arguments about the lower limit are not substantial. The case that the air permeability is 0.9 L/min or more is not preferable because when the crosslinked polyolefin resin foam is used as a sealing material, the originally desired sealing property is impaired.

The air permeability in the thickness direction can be set to less than 0.9 L/min by, for example, a method involving forming a laminate by providing a barrier film capable of suppressing air permeation on at least one side of the foam or a method involving making the cell structure of the foam be a closed cell structure. Examples of the barrier film capable of suppressing air permeability include metal foils such as aluminum foil, and films in which a vapor deposition layer is provided on a film of resin such as nylon. The cell structure of a foam can be made into a closed cell structure by extrusion foaming involving enclosing volatile constituents, a foaming method using a thermal decomposition type blowing agent mentioned later, or the like.

The closed cell structure and the continuous cell structure are now described. The closed cell structure refers to a structure in which there are spaces each of which is isolated from the outside by a cell membrane of resin and suffers from the blockage of exchange of gas such as air (or liquid such as water) (i.e., ventilation is blocked) and the spaces are called cells. Conversely, the continuous cell structure refers to a structure in which the cell membrane partly has a hole so that gas comes and goes and is exchanged between adjacent spaces. In other words, the closed cell structure can be said to be a structure that suppresses air permeability or be most excellent in air tightness.

Whether there is a closed cell structure or a continuous cell structure can be judged by observing a cross section of a foam (this is referred to as "cross sectional observation basis"), but it can be judged also on the basis of air permeability in the thickness direction (this is referred to as "air permeability basis"). That is, in a configuration made of only a foam having no barrier film, when the air permeability in the thickness direction is less than 0.9 L/min, the foam can be judged to have a closed cell structure. Conversely, in a configuration made of only a foam having no barrier film, when the air permeability in the thickness direction is 0.9 L/min or more, the foam can be judged to have a continuous cell structure.

Generally, it is known that a foam with a continuous cell structure (on the cross sectional observation basis) is lower in compressive hardness than a foam with a closed cell structure (on the cross sectional observation basis) if the resins forming the foams are of the same kind In the below-described preferred foam, the compressive hardness in the thickness direction of the foam has the relationship of the compressive hardness (a)<the compressive hardness (b)<the compressive hardness (d), and the cell structure in the thickness direction of the foam also corresponds to compressive hardness. That is, in the cell structure in the thickness direction of the foam, there is a continuous cell structure (on the cross sectional observation basis), but the continuous cell structure (on the cross sectional observation basis) decreases gradually in the thickness direction, resulting in a closed cell structure (on the cross sectional observation basis) on the foam layer (D) side.

It is important for the foam to contain an ethylene-$C_{4-12}$ α-olefin-copolymerized, linear, low-density polyethylene resin (hereinafter referred to as a resin (Y)). The method for producing a linear, low-density polyethylene, which is the resin (Y), is commonly a method using a gas phase method, a solution method, a slurry method, or the like, using a Ziegler type catalyst. Although the kind of the α-olefin to be copolymerized with ethylene is not limited, binary copolymers of ethylene and an α-olefin are common, and a linear, low-density polyethylene resin prepared by copolymerizing an α-olefin having 4 to 8 carbon atoms with ethylene is preferred in terms of price and physical properties. The resin (Y), which is an ethylene-$C_{4-12}$ α-olefin-copolymerized, linear, low-density polyethylene resin, has properties with low crosslinkability to ionizing radiation.

It is important for the foam to contain a low-density polyethylene resin other the $C_{4-12}$ α-olefin-copolymerized, linear, low-density polyethylene resin (that is, other than the resin (Y)) (hereinafter the low-density polyethylene resin other than the resin (Y) is referred to as a resin (X)). Although the method of producing the low-density polyethylene resin, which is the resin (X), is not particularly limited, a low-density polyethylene resin obtained by high pressure radical polymerization typified by a tubular type autoclave reactor is preferred. The resin (X), which is a low-density polyethylene resin other than the resin (Y), has properties with high crosslinkability to ionizing radiation.

To satisfy the requirement that the ratio of the compressive hardness (a) to the compressive hardness (d) is 1/20 to 1/2, which is a feature of our foam, the foam needs to contain a mixture of a resin (X), which is higher in crosslinkability to ionizing radiation, and a resin (Y), which is lower in crosslinkability to ionizing radiation (a mixture of the resin (X) and the resin (Y)).

To satisfy the requirement that the ratio of the compressive hardness (a) to the compressive hardness (d) is 1/20 to 1/2, which is a feature of our foam, it is important regarding the contained proportions of the resin (X) and the resin (Y) that the content of the resin (X) is smaller than the content of the resin (Y).

Preferably, the content of the resin (X) is 20% by mass or more and 45% by mass or less and the content of the resin (Y) is 55% by mass or more and 80% by mass or less where the sum total of the contents of the resin (X) and the resin (Y) is taken as 100% by mass. When the content of the resin (X) is less than 20% by mass where the sum total of the resin (X) and the resin (Y) is taken as 100% by mass, the surface of the foam is prone to roughen, whereas when the content of the resin (X) exceeds 45% by mass, the crosslinkability is so high that it becomes difficult to control the ratio of the compressive hardness (a) to the compressive hardness (d) to be 1/20 to 1/2.

Preferably, the foam contains iron oxide and/or mica. Examples of the iron oxide include ferrous oxide, ferric oxide, and triiron tetraoxide, and these may be used singly or two or more of them may be used in combination. Although such mica is not particularly limited, examples thereof include those derived from natural minerals and those chemically synthesized, specifically, muscovite, phlogopite and glauconite, and these may be used singly or two or more of them may be used in combination.

Preferably, the content of the iron oxide and/or the mica in the foam is 0.5 parts by mass or more and 10 parts by mass or less based on 100 parts by mass in total of the resin (X) and the resin (Y). The case that the content of the iron oxide and/or the mica in the foam is less than 0.5 parts by mass based on 100 parts by mass in total of the resin (X) and the resin (Y) is not preferable because it is difficult to make open the cells of the foam layer (A) side in foaming and the foam will no longer meet the requirement that the ratio of the compressive hardness (a) to the compressive hardness (d) is 1/20 to 1/2 and the requirement of the compressive hardness (a) <the compressive hardness (b) <the compressive hardness (d). The case that the content is larger than 10 parts by mass is not preferable because it becomes difficult to afford a foam with good appearance. The content of the iron oxide and/or the mica in the foam is more preferably from 1 part by mass or more and 5 parts by mass based on 100 parts by mass in total of the resin (X) and the resin (Y).

Although the melt flow rates (MFR) of the resin (X) and the resin (Y) to be used for the crosslinked polyolefin resin foam are not particularly limited, they are preferably within the range of 1.0 to 60 g/10 min as measured under usual conditions including a temperature of 190° C. and a load of 2.16 kgf based on JIS K7210 (1999). If the MFRs are less than 1.0 g/10 min, when a sheet is formed during the process of producing a crosslinked polyolefin resin foam, the surface of the sheet may roughen to cause problems with the appearance of the resulting foam. If the MFRs exceed 60 g/10 min, when a sheet is formed during the process of producing a crosslinked polyolefin resin foam, the thickness of the sheet may vary in the extrusion direction. The melt flow rates (MFR) of the resin (X) and the resin (Y) are more preferably 2.0 to 30 g/10 min.

Thermoplastic resins other than polyethylene resins may be added to the crosslinked polyolefin resin foam so long as the characteristics of the foam are not impaired remarkably. Examples of such thermoplastic resins other than polyethylene resins referred to herein include resins containing no halogen, including polystyrene, acrylic resins such as poly (methyl methacrylate) and styrene-acrylic acid copolymers, styrene-butadiene copolymers, ethylene-vinyl acetate copolymers, ethylene-propylene copolymers, polypropylene, polyvinyl acetate, polyvinyl alcohol, polyvinyl acetal, polyvinyl pyrrolidone, petroleum resins, cellulose, cellulose derivatives such as cellulose acetate, cellulose nitrate, methyl cellulose, hydroxymethyl cellulose, hydroxymethyl cellulose, and hydroxypropyl cellulose, polyolefins such as polypropylene, saturated alkyl polyester resins, aromatic polyester resins such as polyethylene terephthalate, polybutylene terephthalate and polyallytate, polyamide resins, polyacetal resins, polycarbonate resins, polyestersulfone resins, polyphenylene sulfide resins, polyether ketone resins, and copolymers including a vinyl polymerizable monomer and a nitrogen-containing vinyl monomer. Moreover, elastomers such as isoprene rubber, styrene butadiene rubber, butyl rubber, dimethylsilicone rubber and ethylene propylene rubber are also included. Further, examples of resins containing halogen include polyvinyl chloride, polyvinylidene chloride, polychlorotrifluoroethylene, polyvinylidene fluoride resins, fluorocarbon resins, perfluorocarbon resins, and solvent-soluble perfluorocarbon resins. Such thermoplastic resins other than polyethylene resins may be contained singly or two or more of such resins may be contained. The kind and the quantity thereof are chosen according to the desired physical properties.

It is important for the crosslinked polyolefin resin foam that the sum total of the contents of the resin (X) and the resin (Y) is 50% by mass or more and 100% by mass or less where the amount of all the components of the foam is taken as 100% by mass. The content of the above-described thermoplastic resins other than polyethylene resins and other additives is 0% by mass or more and 50% by mass or less where the amount of all the components of the crosslinked polyolefin resin foam is taken as 100% by mass.

Although the gel fraction of the crosslinked polyolefin resin foam is not particularly limited, a gel fraction of 10 to 40% is preferably used. A gel fraction of 15 to 35% is more preferable. The case that the gel fraction is less than 10% is not preferable because the surface is prone to roughen in foaming, and the case that the gel fraction is more than 40% is not preferable because it is difficult to conduct processing in foaming and the yield may drop.

To satisfy the requirement that the ratio of the compressive hardness (a) to the compressive hardness (d) is 1/20 to 1/2, which is a feature of our foam, it is preferable that when the foam is divided in the thickness direction into equal four parts, namely, a foam layer (A), a foam layer (B), a foam layer (C) and a foam layer (D) in this order from one face side of the foam, a difference of 10% or more is made between the gel fraction of the foam layer (A) side and the gel fraction of the foam layer (D) side. The method for making a difference of 10% or more between the gel fraction of the foam layer (A) side and the gel fraction of the foam layer (D) side can be a method of applying ionizing radiation from only one side when applying ionizing radiation, a method of rendering the applied amounts on both sides different from each other, a method of adding an auxiliary crosslinking agent to only one side, or a method involving applying usual irradiation and then applying irradiation at a low voltage to only one side to further apply slight crosslinking Although that method is not particularly restricted, the method of rendering the applied amounts on both sides different from each other is preferably used. The difference between the gel fraction of the foam layer (A) side and the gel fraction of the foam layer (D) side is preferably from 10% or more and 20% or less to satisfy the requirement that ratio of the compressive hardness (a) to the compressive hardness (d) is 1/20 to 1/2.

Setting the gel fraction of the foam layer (A) side to 10% or more lower than the gel fraction of the foam layer (D) side can control the ratio of the compressive hardness (a) to the compressive hardness (d) to be 1/20 to 1/2 and control the compressive hardness to be the compressive hardness (a)<the compressive hardness (b)<the compressive hardness (d).

To further improve the ability of the crosslinked polyolefin resin foam to conform to a mold at the time of being used as a sealing material, the magnitudes of compressive hardness are in the sequence of the compressive hardness (a)<the compressive hardness (b)<the compressive hardness (d) where the 50% compressive hardness of the foam layer (B) is referred to as "compressive hardness (b)."

The means to satisfy the relationship of the compressive hardness (a)<the compressive hardness (b)<the compressive hardness (d) can be a method involving setting the content of the resin (X), which is higher in crosslinkability, to be smaller than the content of the resin (Y), which is lower in crosslinkability, and further setting the amount of heat of the foam layer (A) side to be greater than the amount of heat of the foam layer (D) side in the foaming step described below.

The thermal decomposition type blowing agent to be used when producing the crosslinked polyolefin resin foam is not particularly limited so long as it has a decomposition temperature higher than the melt temperature of a resin composition containing the polyolefin resin that is a raw material of the foam. Preferred is azodicarbonamide, and there can be used hydrazodicarbonamide, azodicarboxylic acid barium salt, dinitrosopentaethylenetetramine, nitrosoguanidine, p,p'-oxybisbenzenesulfonylsemicarbazide, trihydrazine symmetric triazine, bisbenzenesulfonylhydrazide, barium azodicarboxylate, azobisisobutyronitrile, and toluenesulfonylhydrazide, each having the same as or higher decomposition temperature than that of azodicarbonamide. These thermal decomposition type blowing agents may be used alone or in a combination of two or more thereof.

The amount of the thermal decomposition type blowing agent is generally about 2 to about 40 parts by mass based on 100 parts by mass of the total amount of resin components (hereinafter "100 parts by mass in total of resin components" means 100 parts by mass of the total amount of all resins including the polyolefin resin and other thermoplastic resins and the like; in this case, the resin components include a resin in pellets prepared by master-batching additives and the like (pelletizing the additives and the like with the resin)), and the amount is set according to a desired expansion ratio.

The apparent density of the crosslinked polyolefin resin foam is preferably 0.015 to 0.033 $g/cm^3$, and more preferably is 0.020 to 0.030 $g/cm^3$. When the apparent density is less than 0.015 $g/cm^3$, the surface of the foam is prone to be damaged, and when the apparent density is more than 0.033 $g/cm^3$, there is a problem that the foam hardly conforms to a mold.

The apparent density can be controlled to 0.015 to 0.033 $g/cm^3$ by adjusting the amount of the above-mentioned thermal decomposition type blowing agent. It is important to choose the amount adjustably depending upon the type of the thermal decomposition type blowing agent, the gas volume, and the polyolefin resin and other thermoplastic resins and the like to be used.

In producing the crosslinked polyolefin resin foam, a polyfunctional monomer can be included as an auxiliary crosslinking agent in the resin composition containing the polyolefin resin that is a raw material of the foam so long as properties of the foam are not impaired. As the polyfunctional monomer there can be used such monomers as divinylbenzene, diallylbenzene, divinylnaphthalene, divinylbiphenyl, divinylcarbazole, divinylpyridine, and nucleus-substituted compounds and related analogues thereof; (meth)acrylic acid-based compounds such as ethylene glycol di(meth)acrylate, butylene glycol di(meth)acrylate, triethylene glycol di(meth)acrylate, tetraethylene glycol di(meth)acrylate, 1,6-hexanediol di(meth)acrylate, 1,9-nonanediol di(meth)acrylate, and 1,10-decanediol di(meth)acrylate; vinyl esters of aliphatic and aromatic dibasic carboxylic acids such as divinyl phthalate, diallyl phthalate, diallyl maleate and bisacryloyloxyethyl terephthalate; vinyl ethers and allyl ethers of aliphatic and aromatic dihydric alcohols such as allyl esters, acryloyloxyalkyl esters, methacryloyloxyalkyl esters, diethylene glycol divinyl ether, triethylene glycol divinyl ether, tetraethylene glycol divinyl ether, polyethylene glycol divinyl ether, hydroquinone divinyl ether and bisphenol A diallyl ether; maleimide-based compounds such as N-phenylmaleimide and N,N'-m-phenylenebismaleimide; and compounds having two triple bonds such as dipropargyl phthalate and dipropargyl maleate. Moreover, trimethylolpropane tri(meth)acrylate and 1,6-hexanediol di(meth)acrylate; trimethylolpropane tri (meth)acrylate, 1,6-hexanediol di(meth)acrylate and 1,9-nonanediol di(meth)acrylate; trimethylolpropane tri(meth)acrylate and divinylbenzene; trimethylolpropane tri(meth)acrylate, triallyl cyanurate and 1,6-hexanediol di(meth)acrylate; triallyl cyanurate and 1,6-hexanediol di(meth)acrylate; triallyl isocyanurate and 1,6-hexanediol di(meth)acrylate and the like can be used. For example, divinylbenzene, trimethylolpropane trimethacrylate, 1,9-nonanediol dimethacrylate, 1,10-decanediol dimethacrylate, triallyl trimellitate, triallyl isocyanurate, and ethylvinylbenzene can be used. These auxiliary crosslinking agents may be used singly or in combination.

The amount of the auxiliary crosslinking agent is preferably from 0.1 to 30 parts by mass, more preferably from 0.5 to 15 parts by mass, based on 100 parts by mass of the total amount of the resin components and is adjusted depending on the desired gel fraction.

So long as the desired feature of our foam is not impaired, the polyolefin resin composition, the raw material of the crosslinked polyolefin resin foam, can contain various additives such as decomposition accelerators of the blowing agent, cell-nucleation adjustors, antioxidants, heat stabilizers, colorants, flame retardants, antistatic agents and inorganic fillers.

The foam preferably has a continuous cell ratio of 30% to 80%, more preferably 35% to 70% because a higher continuous cell ratio results in more flexible compressive hardness but decreases the water blocking performance required by sealing properties. If the continuous cell ratio is less than 30%, moderate flexibility may not be obtained, whereas if the continuous cell ratio exceeds 80%, the water-blocking performance may deteriorate remarkably. The continuous cell ratio is a value measured in accordance with measuring method 2 (measurement of non-air permeable volume by volume expansion method) of JIS K7138 (2006) "Rigid Cellular Plastics—Determination of the Volume Percentage of Open Cells and of Closed Cells."

The crosslinked polyolefin resin foam can be produced by forming the polyolefin resin composition obtained by mixing the components described above into a prescribed form, followed by crosslinking and foaming.

Specifically, the following production method is mentioned, for example. A predetermined amount of the above polyolefin resin composition is uniformly melt-kneaded at a temperature lower than a decomposition temperature of the thermal decomposition type blowing agent using a kneader such as single screw extruder, twin screw extruder, Banbury mixer, kneader mixer or mixing roll, and then the kneaded mixture is formed into a sheet.

Subsequently, the resulting sheet is irradiated with ionizing radiation at a prescribed dose, thereby curing the olefin resin, and the crosslinked sheet is foamed by heating it to a temperature higher than the decomposition temperature of the thermal decomposition type blowing agent. Alternatively, crosslinking with peroxide or silane crosslinking may be conducted in place of crosslinking by irradiation with ionizing radiation.

Subsequently, this foamable sheet is irradiated with ionizing radiation, thereby crosslinking the resin constituting the foamable sheet. As the ionizing radiation, electron beam, X-ray, β-ray, γ-ray and the like are used.

The irradiation dose is commonly from about 1 to 300 kGy and the dose is adjusted depending on the desired gel fraction. To attain the desired features, it is required to make a difference of 10% or more between the gel fraction of the face (A) side and the gel fraction of the face (B) side, as recited above. The method therefor can be a method of applying ionizing radiation from only one side when applying ionizing radiation, a method of rendering the applied amounts on both sides different from each other, a method of adding an auxiliary crosslinking agent to only one side, or a method involving applying usual irradiation and then applying irradiation at a low voltage to only one side to further apply slight crosslinking Although that method is not particularly restricted, the method of rendering the applied amounts on both sides different from each other is preferably used.

The foamable sheet in which the resin is crosslinked is heated to a temperature that is equal to or higher than the decomposition temperature of the thermal decomposition type blowing agent and is equal to or higher than the melting point of the resin, for example, 190 to 290° C. by using hot air, infrared ray, a metal bath, an oil bath, a salt bath, or the like, and then the resin is foamed by a decomposition gas of the blowing agent, thus obtaining a crosslinked polyolefin resin foam.

In the case of heating to a temperature that is equal to or higher than the decomposition temperature of the thermal decomposition type blowing agent and is equal to or higher than the melting point of the resin, the amount of heat of the foam layer (A) in the foaming step can be rendered larger than the amount of heat of the foam layer (D) side, for example, by heating with infrared heaters in the foaming step while rendering the power density of the infrared heater for heating the foam layer (A) side larger than the power density of the infrared heater for heating the foam layer (D) side. In the case of using an infrared heater and a salt bath when heating in the foaming step, that can be attained by rendering the power density of the infrared heater for heating the foam layer (A) side larger and lowering the set up temperature of the salt bath for heating the foam layer (D) side.

Preferably, the crosslinked polyolefin resin foam is a foam with a monolayer configuration. Forming a foam in a monolayer configuration is preferable in that the cost can be saved more as compared with a foam with a multilayer configuration.

Moreover, a laminate can be obtained by using a crosslinked polyolefin resin foam by the method described above.

The layer to be laminated in forming a laminate using the crosslinked polyolefin resin foam refers to a material selected from at least one selected from known materials including skin materials such as a cloth-like article made of a natural fiber or an artificial fiber, a sheet made of a polyvinyl chloride resin, a sheet made of thermoplastic olefin (TPO), a thermoplastic elastomer sheet, and leather, a nonwoven fabric made of thermoplastic resin fiber, a polyolefin resin noncrosslinked foamed sheet, a continuous cell foam (on the air permeability basis) made of polyurethane and the like, films such as a polyester film and a polyacrylic film, a plastic cardboard, foamed paper, and a metal layer made of copper, silver, nickel, or the like. These may be laminated in two or more layers, or may be laminated on both sides, i.e., the front side and the rear side, of the crosslinked polyolefin resin foam, or may be laminated on only one side.

Examples of the method of forming a laminate by laminating the crosslinked polyolefin resin foam with the above-described layer include an extrusion lamination method of melting a thermoplastic resin on the foam, a bond lamination method of laminating after applying an adhesive onto the foam, a heat lamination method (also referred to as fusion) of laminating a skin material and the like and, if necessary, a crosslinked polyolefin resin foam by heating, a hot melt method, and a high frequency welder method, and also include an electroless plating method, an electroplating method and a vacuum deposition method in case of using metal. However, the method is not limited to these methods and may be any method so long as the bonding is attained.

The crosslinked polyolefin resin foam obtained is used suitably as a sealing material. The sealing material referred to herein is a material to be filled into a joint part so that no gap is remained in an item requiring for water tightness and air tightness in electric appliances and the like. The characteristics required as a sealing material include flexibility high enough for conforming to the shape of a joint as well as water tightness and air tightness. Many continuous cell foams (on the air permeability basis) superior in the conformability have heretofore been used, but water tightness and air tightness have not been exhibited successfully without applying high compression. In contrast, the preferred crosslinked polyolefin resin foam obtained is a foam having a closed cell structure as described above, and the foam is characterized by being good in conformability in this preferred foam in spite of the fact that it is a closed cell foam (on the air permeability basis), and also by having both water tightness and air tightness, which are inherent to closed cells. Thus, the foam is advantageous in economical aspect because it can exhibit sealing properties in spite of low compression.

It is noted that its application is not limited to a sealing material and may be a cushioning medium, a packaging and wrapping material and the like.

EXAMPLES

Physical properties were evaluated by the methods described below.

Method for Measurement of Thickness

The measurement is conducted in conformity with ISO 1923 (1981) "Cellular Plastics and Rubbers—Determination of Linear Dimensions." Specifically, the thickness of a foam is measured using a dial gauge having a measured area of about 10 cm$^2$.

Method for Measurement of Melting Point by Differential Scanning Calorimetric Analysis Differential scan calorimetric analysis was conducted by the following method. About 5 mg of a polyolefin resin was weighed precisely to 0.1 mg, and it was then put in a platinum pan, followed by measurement using a differential scanning calorimeter (DSC: RDC220-Robot DSC manufactured by Seiko Electronic Co. Ltd.).

In the measurement, the temperature was raised from 50° C. to 200° C. at a rate of 10° C./min and then held for 5 minutes, the temperature was then lowered from 200° C. to −50° C. at a rate of 10° C./min and then held for 5 minutes, and subsequently the temperature was raised from −50° C. to 200° C. at a rate of 10° C./min. The endothermic peak detected in the second temperature rising process was defined as a melting point.

Method for Measurement of Resin Density

The measurement is conducted in conformity with JIS K6922-1, 2 (1997) "Plastics-Polyethylene (PE) Moulding and Extrusion Materials." Specifically, the measurement is conducted using an extrudate from a melt indexer. A sample extruded with a standard melt indexer at 190° C. is cut into a suitable length not to contain bubbles, and then it is left at rest on a cold metal plate. Thereafter the sample is put in 200 mL of boiling water for 30 minutes, thereby conducting anneal, and then the density is measured within 24 hours. A melt indexer F-B01 manufactured by Toyo Seiki Seisaku-sho, Ltd. was used.

Method for Measurement of Melt Flow Rate

The measurement is conducted in conformity with JIS K7210 (1999) "Plastics—Determination of the Melt Mass-Flow Rate (MFR) and the Melt Volume-Flow Rate (MVR) of Thermoplastics". The test was conducted under the conditions of a temperature of 230° C. and a load of 2.16 kgf (21.7 N) in the case of a polypropylene-based resin, or conducted under the conditions of a temperature 190° C. and a load of 2.16 kgf (21.7 N) in the case of a polyethylene-based resin on the basis of Annex B (Reference) of the above standards "Standards, Designation and Test Conditions of Thermoplastic Plastic Materials". The melt flow rate is defined by the mass of the resin discharged through a die for 10 minutes by using a melt indexer F-B01 manufactured by Toyo Seiki Seisaku-sho, Ltd. and using a manual cutting method.

Method for Measurement of Gel Fraction

A crosslinked polyolefin resin foam is first cut with a single-edged knife into a rectangle shape in the longitudinal direction at an interval of about 0.5 mm and then cut with scissors in the width direction at an interval of about 0.5 mm interval, and then about 100 mg of the cut piece is weighed precisely to 0.1 mg. The piece is immersed in 200 ml of tetralin at 130° C. for 3 hours and then filtered under gravity through a 100 mesh stainless steel wire gauze, washed with acetone, and exposed to dry air for 15 seconds, and then the insoluble matter remaining on the wire gauze is dried in a hot air oven at 120° C. for 1 hour. Subsequently, the insoluble matter was cooled for 10 minutes in a desiccator containing silica gel and then it was weighed precisely, followed by the calculation of a gel fraction in percentage according to the following equation:

Gel fraction (%)={Mass (mg) of Insoluble Component/Mass (mg) of Weighed Polyolefin Resin Foam}×100.

The average of three measurements obtained by the removal of the minimum and the maximum from the measurements of five samples was used as a NET gel fraction.

In the measurement of the gel fraction of the foam layer (A) side and the gel fraction of the foam layer (D) side, a foam was divided into four portions in the thickness direction by using a slicing apparatus (NP720) manufactured by NIPPIY, and then respective divided foams (the foam including the foam layer (A) obtained by the division and the foam including the foam layer (D) obtained by the division) were measured by the above-described method for measuring a gel fraction. Five samples (five foams) were each divided, and the average of three measurements obtained by the removal of the minimum and the maximum from the values obtained by the measurement of the five samples was used as the gel fraction of the foam layer (A) side or the gel fraction of the foam layer (D) side.

Method for Measurement of Apparent Density

An apparent density was measured in conformity with JIS K6767 (1999) "Cellular plastics—Polyethylene—Methods of Test."

A sample is punched out into a size of 15 cm$^3$ or more (for example, 10 cm on each side), followed by measurement of the thickness and the mass. The volume of the sample was calculated from the area (100 cm$^2$ in the case of being 10 cm on each side) and the thickness of the sample, and then the apparent density was calculated by the following equation:

Apparent Density (kg/m$^3$)=Sample Mass (kg)/{Sample Thickness (m)×Sample Area (m$^2$)}.

The average of three measurements obtained by the removal of the minimum and the maximum from the measurements of five samples was used as an apparent density.

Method for Measurement of Compression Hardness of Foam and Foamed Layer

The 50% compressive hardness of a foam is measured in conformity with JIS K6767 (1999) "Cellular plastics—Polyethylene—Methods of Test." Specifically, foams are piled so that the overall thickness thereof is 25 mm or more and then the drag exerted when the piled foams is compressed by 50% of the overall thickness is measured. The measuring instrument to be used herein is a tensilon universal testing machine UCT-500 manufactured by ORIENTEC Co., Ltd.

The 50% compressive hardness of each of the foam layer (A), the foam layer (B), and the foam layer (D) was measured by conducting the above-described method of measuring the compressive hardness of a foam, for respective foamed layers obtained by dividing a foam into four sections in the thickness direction by using a slicing apparatus (NP720) manufactured by NIPPIY.

Method for Measurement of Air Permeability of Foam

The air permeability refers to one measured by a measuring method in accordance with the method B provided in JIS K6400-7 (2004) "Flexible Cellular Polymeric Materials—Physical Properties—Part 7: Determination of Air Flow Value" and a measured value measured with a method B air permeability tester A050 manufactured by Imoto Machinery Co., Ltd. is adopted. Whether the air permeability is or is not less than 0.9 L/min, which is smaller than the detection limit of the smallest manometer, was checked using this method.

Method for Evaluation of Sealing Properties of Foam

Two 5-mm thick acrylic plates cleaned with ethanol are prepared and a sample punched into U-shape is stuck on its face (D) (the face on the foam layer (D) side) to one acrylic plate with a double-sided adhesive tape (arbitrarily in Comparative Example 5, in which no face designation is made). An acrylic plate is loaded on the other face (the face on the foam layer (A) side) so that the designated compression ratio (here 50%) based on the thickness of the sample before punching is achieved and is set using a vise or the like. The sample is held with the U-shaped portion facing up and distilled water is poured therein so that the water depth reaches 10 cm. This was controlled at room temperature and then the presence or absence of water leakage after one hour was checked.

Evaluation Criteria

A: It can be compressed easily to the designated compression ratio and allows no water leakage after one hour.
B: It can be compressed easily to the designated compression ratio but water is observed outside the system after one hour (there is no water leakage).
C: It is difficult to be compressed to the designated compression ratio (but it can be compressed by the application of force), but water is observed outside the system after one hour.
D: Water leakage is observed or it cannot be compressed to the designated compression ratio even under the application of force.

Method for Measurement of Continuous Cell Ratio

The continuous cell ratio was measured in accordance with measuring method 2 (measurement of non-air permeable volume by volume expansion method) of JIS K7138 (2006) "Rigid Cellular Plastics—Determination of the Volume Percentage of Open Cells and of Closed Cells."

Hereinafter, our foams are described in more detail by providing Examples. The raw materials used in Examples and Comparative Examples are shown below.

Resin X

Low density polyethylene (produced by Japan Polyethylene Corporation; grade designation: LE602; melting point: 106° C.; MFR: 6 g/10 min; density: 0.922 g/cm$^3$) . . . code X1

Low density polyethylene (produced by Tosoh Corporation; grade designation: Petro-cene 226; melting point: 112° C.; MFR: 2 g/10 min; density: 0.924 g/cm$^3$) . . . code X2

Low density polyethylene (produced by Tosoh Corporation; grade designation: Petro-cene 202; melting point: 106° C.; MFR: 24 g/10 min; density: 0.918 g/cm$^3$) . . . code X3

Resin Y

Linear, low-density polyethylene (produced by Tosoh Corporation; grade designation: M65; melting point: 122° C.; MFR: 20 g/10 min; density: 0.920 g/cm$^3$) . . . code Y1

Linear, low-density polyethylene (produced by Tosoh Corporation; grade designation: M75; melting point: 122° C.; MFR: 50 g/10 min; density: 0.920 g/cm$^3$) . . . code Y2

Linear, low-density polyethylene (produced by Tosoh Corporation; grade designation: M55; melting point: 122° C.; MFR: 8 g/10 min; density: 0.920 g/cm$^3$) . . . code Y3

Linear, low-density polyethylene (produced by Tosoh Corporation; grade designation: FR266A; melting point: 124° C.; MFR: 2 g/10 min; density: 0.927 g/cm$^3$) . . . code Y4

Other Resins

Ethylene-propylene random copolymer (produced by Japan Polyethylene Corporation; grade designation: EG6D melting point: 140° C.; MFR: 1.5 g/10 min; density: 0.902 g/cm$^3$).

Example 1

Of the polyolefin resins (1), 70% by mass of a linear, low-density polyethylene (produced by TOSOH Corporation, grade designation: M65), being resin (Y), and of the polyolefin resins (2), 30% by mass of a low-density polyethylene (produced by Japan Polyethylene Corporation, grade designation: LE602), being resin (X), were mixed; when the overall amount of the above-mentioned polyolefin resins was taken as 100 parts by mass, 20 parts by mass of azodicarbonamide (produced by Eiwa Chemical Ind. Co., Ltd., grade designation: M-1) as a blowing agent was mixed by a Henschel mixer, and charged into a 60 φ extruder; the mixture was melt-kneaded while controlling the temperature in the cylinder at 150° C. and then shaped into a sheet in a thickness of 4.3 mm; and the resultant was wound up temporarily.

Further, the polyolefin resin foam sheet was irradiated with ionizing radiation on both sides by using electron beam irradiators at 800 kV so that the irradiation dose on the face (A) side (the face on the foam layer (A) side) was 38 kGy and the irradiation dose on the face (D) side (the face on the foam layer (D) side) was 63 kGy, and then the sheet was floated with the face on the foam layer (D) side being in contact with a salt bath (salt bath temperature: 225° C.) and was heated on the face on the foam layer (A) side with an infrared heater (heater power density: 3 kW/m$^2$) along the flow direction and thereby foamed. Thus, a foam having the characteristics given in Table 2-1 was obtained.

The resulting foam was sliced not to be collapsed in the thickness direction, forming a sliced chip of 50 μm in thickness, which was then observed with an optical microscope. It was confirmed that there was a continuous cell structure (on the cross sectional observation basis), but the continuous cell structure (on the cross sectional observation basis) decreased gradually in the thickness direction, resulting in a closed cell structure (on the cross sectional observation basis) on the foam layer (D) side, and the cell structure changed in a gradient fashion in the thickness direction.

Examples 2 to 6

In Examples 2 to 6, foams were produced using resin (X), resin (Y), a blowing agent, additives, sheet thickness, ionizing radiation, the foaming step and the like according to Table 1-1, and setting other conditions as the same as Example 1. As a result, foams having the characteristics given in Table 2-1 were obtained.

As a result of observing a slice section with an optical microscope in the same manner as Example 1, it was confirmed that there was a continuous cell structure (on the cross sectional observation basis) on the foam layer (A) side, but the continuous cell structure (on the cross sectional observation basis) decreased gradually in the thickness direction, resulting in a closed cell structure (on the cross sectional observation basis) on the foam layer (D) side, and the cell structure changed in a gradient fashion in the thickness direction.

Examples 7, 8

In Example 7, the face on the foam layer (D) side was heated with hot air (hot air temperature: 230° C.) so that the foam was floated up, and the foam layer (A) side was heated with an infrared heater (heater power density: 3 kW/m$^2$). Thus, a foam was obtained. In Example 8, a sheet was hung and then heated on the foam layer (A) side and the foam layer (D) side with hot air (hot air temperature: 240° C.) and an infrared heater (heater power density: 4 kW/m$^2$), respectively. Thus, a foam was obtained. In both Examples 7 and 8, 0.2 parts by mass of IRGANOX 1010 (produced by Ciba Specialty Chemicals) was added as an antioxidant. Foams were produced using resin (X), resin (Y), a blowing agent, additives, sheet thickness, ionizing radiation and the like according to Table 1-2 except for the foaming step and an antioxidant, and setting other conditions as the same as Example 1. As a result, foams having the characteristics given in Table 2-2 were obtained.

As a result of observing a slice section with an optical microscope in the same manner as Example 1, it was confirmed that there was a continuous cell structure (on the cross sectional observation basis) on the foam layer (A) side, but the continuous cell structure (on the cross sectional observation basis) decreased gradually in the thickness direction, resulting in a closed cell structure (on the cross sectional observation basis) on the foam layer (D) side, and the cell structure changed in a gradient fashion in the thickness direction.

Comparative Examples 1, 2

In Comparative Examples 1 and 2, foams were produced using resin (X), resin (Y), a blowing agent, sheet thickness, ionizing radiation, the foaming step and the like according to Table 1-2, and setting other conditions as the same as Example 1. As a result, foams given in Table 2-2 were obtained.

As a result of observing a slice section with an optical microscope in the same manner as Example 1, it was confirmed that there was a closed cell structure (on the cross sectional observation basis) on the foam layer (A) side, but there was no continuous cell structure (on the cross sectional observation basis) in the thickness direction, resulting in a closed cell structure (on the cross sectional observation basis) on the foam layer (D) side, and the cell structure did not change in a gradient fashion in the thickness direction.

Comparative Examples 3, 4

In Comparative Examples 3 and 4, foams were produced using a resin composition, a blowing agent, ionizing radiation, the foaming step and the like according to Table 1-2, and further adding 3 parts by mass of divinylbenzene as an auxiliary crosslinking agent, and adjusting the sheet thickness of Comparative Example 3 to 4.3 mm and the sheet thickness of Comparative Example 4 to 2.0 mm. As a result, foams having the apparent densities, the gel fractions, and the thicknesses given in Table 2-2 were obtained.

As a result of observing a slice section with an optical microscope in the same manner as Example 1, it was confirmed that there was a closed cell structure (on the cross sectional observation basis) on the foam layer (A) side, but there was no continuous cell structure (on the cross sectional observation basis) in the thickness direction, resulting in a closed cell structure (on the cross sectional observation basis) on the foam layer (D) side, and the cell structure did not change in a gradient fashion in the thickness direction.

Comparative Example 5

As Comparative Example 5, Ruseela N commercially available from Toyo Quality One Corporation was purchased. For the foams prepared by the above-described methods and the purchased Ruseela N produced by Toyo Quality One Corporation as an EPDM foam sealing material as Comparative Example 5, 50% compressive hardness, air permeability, and sealing properties were examined as characteristics and the results are summarized in Table 2-2.

An attempt to obtain a sliced chip to observe a slice section as in Example 1 resulted in failure.

TABLE 1-1

| | | | | Example 1 | Example 2 | Example 3 | Example 4 | Example 5 | Example 6 |
|---|---|---|---|---|---|---|---|---|---|
| Composition | Polyolefin resin (1) | Resin Y | | Y1 | Y2 | Y2 | Y1 | Y3 | Y1 |
| | | MFR | g/10 min | 20 | 50 | 50 | 20 | 8 | 20 |
| | | Melting point | ° C. | 122 | 122 | 122 | 122 | 122 | 122 |
| | | Density | g/cm$^3$ | 0.92 | 0.92 | 0.92 | 0.92 | 0.92 | 0.92 |
| | | Proportion | % by mass | 70 | 70 | 70 | 55 | 70 | 80 |
| | Polyolefin resin (2) | Resin X | | X1 | X1 | X2 | X1 | X3 | X1 |
| | | MFR | g/10 min | 6 | 6 | 2 | 6 | 24 | 6 |
| | | Melting point | ° C. | 106 | 106 | 112 | 106 | 106 | 106 |
| | | Density | g/cm$^3$ | 0.922 | 0.922 | 0.924 | 0.922 | 0.918 | 0.922 |
| | | Proportion | % by mass | 30 | 30 | 30 | 45 | 30 | 20 |

TABLE 1-1-continued

|  |  |  | | Example 1 | Example 2 | Example 3 | Example 4 | Example 5 | Example 6 |
|---|---|---|---|---|---|---|---|---|---|
|  | Polyolefin resin (3) | Resin | | — | — | — | — | — | — |
|  |  | MFR | g/10 min | — | — | — | — | — | — |
|  |  | Melting point | °C. | — | — | — | — | — | — |
|  |  | Density | g/cm³ | — | — | — | — | — | — |
|  |  | Proportion | % by mass | — | — | — | — | — | — |
|  | Total amount of resin components | | parts by mass | 100 | 100 | 100 | 100 | 100 | 100 |
|  | Blowing agent | Azodicarbonamide | parts by mass | 20 | 15 | 20 | 20 | 20 | 23 |
|  | Additives | Iron oxide (ferric oxide) | parts by mass | — | — | 3 | — | — | — |
|  |  | Iron oxide (triiron tetraoxide) | parts by mass | — | — | — | — | 2 | — |
|  |  | Mica (muscovite) | parts by mass | — | — | — | 2 | — | — |
|  |  | Mica (phlogopite) | parts by mass | — | — | — | 5 | — | 3 |
| Conditions | Sheet size | Sheet thickness | mm | 4.3 | 4.3 | 4.3 | 4.3 | 4.3 | 4.3 |
|  | Ionizing radiation | Acceleration voltage | kV | 900 | 900 | 900 | 900 | 900 | 900 |
|  |  | Dose of foam layer (A) | kGy | 38 | 38 | 38 | 38 | 50 | 38 |
|  |  | Dose of foam layer (D) | | 63 | 63 | 63 | 63 | 63 | 63 |
|  | Foaming step | Heating method of foam layer (A) side | — | Infrared heater | Infrared heater | Infrared heater | Infrared heater | Infrared heater | Infrared heater |
|  |  | Heating method of foam layer (D) side | — | Salt bath | Salt bath | Salt bath | Salt bath | Salt bath | Salt bath |

TABLE 1-2

|  |  |  | | Example 7 | Example 8 | Comparative Example 1 | Comparative Example 2 | Comparative Example 3 | Comparative Example 4 | Comparative Example 5 |
|---|---|---|---|---|---|---|---|---|---|---|
| Composition | Polyolefin resin (1) | Resin Y | | Y4 | Y1 | Y1 | — | Y1 | — | — |
|  |  | MFR | g/10 min | 2 | 20 | 20 | — | 20 | — | — |
|  |  | Melting point | °C. | 124 | 122 | 122 | — | 122 | — | — |
|  |  | Density | g/cm³ | 0.927 | 0.92 | 0.92 | — | 0.92 | — | — |
|  |  | Proportion | % by mass | 65 | 56 | 40 | — | 100 | — | — |
|  | Polyolefin resin (2) | Resin X | | X1 | X1 | X1 | X1 | — | X1 | — |
|  |  | MFR | g/10 min | 6 | 6 | 6 | 6 | — | 6 | — |
|  |  | Melting point | °C. | 106 | 106 | 106 | 106 | — | 106 | — |
|  |  | Density | g/cm³ | 0.922 | 0.922 | 0.922 | 0.922 | — | 0.922 | — |
|  |  | Proportion | % by mass | 35 | 44 | 60 | 100 | — | — | — |
|  | Polyolefin resin (3) | Resin | | — | — | — | — | — | Ethylene-propylene random copolymer | Ethylene-propylene-diene rubber |
|  |  | MFR | g/10 min | — | — | — | — | — | 1.5 | — |
|  |  | Melting point | °C. | — | — | — | — | — | 140 | — |
|  |  | Density | g/cm³ | — | — | — | — | — | 0.902 | — |
|  |  | Proportion | % by mass | — | — | — | — | — | 50 | — |
|  | Total amount of resin components | | parts by mass | 100 | 100 | 100 | 100 | 100 | 100 | — |
|  | Blowing agent | Azodicarbonamide | parts by mass | 20 | 20 | 20 | 20 | 20 | 20 | — |
|  | Additives | Iron oxide (ferric oxide) | parts by mass | 1 | — | — | — | — | — | — |
|  |  | Iron oxide (triiron tetraoxide) | parts by mass | — | 8 | — | — | — | — | — |
|  |  | Mica (muscovite) | parts by mass | 5 | — | — | — | — | — | — |
|  |  | Mica (phlogopite) | parts by mass | — | — | — | — | — | — | — |

TABLE 1-2-continued

|  |  |  |  | Example 7 | Example 8 | Comparative Example 1 | Comparative Example 2 | Comparative Example 3 | Comparative Example 4 | Comparative Example 5 |
|---|---|---|---|---|---|---|---|---|---|---|
| Conditions | Sheet size | Sheet thickness | mm | 4.3 | 2.2 | 4.3 | 4.3 | 4.3 | 2.0 | — |
|  | Ionizing radiation | Acceleration voltage | kV | 900 | 800 | 900 | 900 | 900 | 900 | — |
|  |  | Dose of foam layer (A) | kGy | 38 | 23 | 38 | 18 | 45 | 125 | — |
|  |  | Dose of foam layer (D) |  | 63 | 48 | 63 | 27 | 70 | 0 | — |
|  | Foaming step | Heating method of foam layer (A) side | — | Infrared heater | Hot air + Infrared heater | Infrared heater | Infrared heater | Infrared heater | Infrared heater | — |
|  |  | Heating method of foam layer (D) side | — | Hot air | Hot air + Infrared heater | Salt bath | Salt bath | Salt bath | Salt bath | — |

TABLE 2-1

|  |  |  |  | Example 1 | Example 2 | Example 3 | Example 4 | Example 5 | Example 6 |
|---|---|---|---|---|---|---|---|---|---|
| Foam properties | Apparent density |  | g/cm³ | 0.022 | 0.030 | 0.021 | 0.024 | 0.023 | 0.017 |
|  | Gel fraction | NET | % | 19 | 18 | 17 | 22 | 25 | 19 |
|  |  | Foam layer (A) |  | 12 | 11 | 10 | 13 | 19 | 12 |
|  |  | Foam layer (D) |  | 23 | 22 | 22 | 26 | 27 | 23 |
|  | Thickness |  | mm | 9.6 | 8.2 | 9.2 | 9.2 | 9.4 | 9.8 |
|  | 50% Compressive hardness |  | kPa | 60 | 66 | 30 | 35 | 63 | 40 |
|  | 50% Compressive hardness | Foam layer (A) | kPa | 7 | 10 | 5 | 5.4 | 22 | 12 |
|  |  | Foam layer (B) |  | 50 | 53 | 15 | 17 | 53 | 45 |
|  |  | Foam layer (D) |  | 58 | 67 | 40 | 50 | 60 | 55 |
|  |  | Ratio a/d |  | 0.12 | 0.15 | 0.13 | 0.11 | 0.37 | 0.22 |
|  | Air permeability | Method B | L/min | less than 0.9 | less than 0.9 | less than 0.9 | less than 0.9 | less than 0.9 | less than 0.9 |
|  | Continuous cell ratio | Measuring method 2 | % | 61 | 54 | 69 | 68 | 39 | 63 |
|  | Sealing property evaluation |  |  | B | B | A | A | B | B |

TABLE 2-2

|  |  |  |  | Example 7 | Example 8 | Comparative Example 1 | Comparative Example 2 | Comparative Example 3 | Comparative Example 4 | Comparative Example 5 |
|---|---|---|---|---|---|---|---|---|---|---|
| Foam properties | Apparent density |  | g/cm³ | 0.023 | 0.025 | 0.023 | 0.028 | 0.035 | 0.038 | 0.090 |
|  | Gel fraction | NET | % | 17 | 18 | 24 | 19 | 22 | 25 | — |
|  |  | Foam layer (A) |  | 10 | 10 | 15 | 16 | 18 | 23 | — |
|  |  | Foam layer (D) |  | 21 | 23 | 25 | 24 | 26 | 24 | — |
|  | Thickness |  | mm | 9.8 | 4.8 | 9.4 | 9.2 | 8.8 | 4.1 | 5.0 |
|  | 50% Compressive hardness |  | kPa | 58 | 65 | 90 | 84 | 87 | 100 | 7 |
|  | 50% Compressive hardness | Foam layer (A) | kPa | 15 | 24 | 85 | 79 | 90 | 98 | — |
|  |  | Foam layer (B) |  | 49 | 52 | 87 | 86 | 88 | 95 | — |
|  |  | Foam layer (D) |  | 73 | 72 | 95 | 89 | 90 | 105 | — |
|  |  | Ratio a/d |  | 0.21 | 0.33 | 0.89 | 0.89 | 1.00 | 0.93 | Unmeasurable |
|  | Air permeability | Method B | L/min | less than 0.9 | less than 0.9 | less than 0.9 | less than 0.9 | less than 0.9 | less than 0.9 | 0.9 or more |
|  | Continuous cell ratio | Measuring method 2 | % | 48 | 46 | 12 | 15 | 17 | 18 | Unmeasurable |
|  | Sealing property evaluation |  |  | A | A | D | D | D | D | D |

The invention claimed is:

1. A crosslinked polyolefin resin foam, wherein a $C_{4-12}$ α-olefin-copolymerized, linear, low-density polyethylene resin is a resin (Y), and a low-density polyethylene resin other than the resin (Y) is a resin (X), the content of the resin (X) is 20% by mass or more and 45% by mass or less and the content of the resin (Y) is 55% by mass or more and 80% by mass or less based on 100% by mass of the resin (X) and the resin (Y); the sum total of the resin (X) and the resin (Y) is 50% by mass or more and 100% by mass or less based on 100% by mass of all the components of the foam; the 50% compressive hardness is 70 kPa or less; wherein the foam comprises four equal layers in the thickness direction, a foam layer (A), a foam layer (B), a foam layer (C) and a foam layer (D) in this order from one face side of the foam, and the 50% compressive hardness of the foam layer (A) and that of the foam layer (D) are compressive hardness (a) and compressive hardness (d), respectively, the ratio of the compressive hardness (a) to the compressive hardness (d) is 1/20 to 1/2; and the air permeability in the thickness direction is less than 0.9 L/min.

2. The foam according to claim 1, the foam comprising iron oxide and/or mica.

3. The foam according to claim 2, wherein the 50% compressive hardness of the foam layer (B) is compressive hardness (b), the magnitude of compressive hardness is in the order of the compressive hardness (a)<the compressive hardness (b)<the compressive hardness (d).

4. The foam according to claim 2, wherein the apparent density of the foam is 0.015 to 0.033 g/cm3.

5. The foam according to claim 1, wherein the 50% compressive hardness of the foam layer (B) is compressive hardness (b), the magnitude of compressive hardness is in the order of the compressive hardness (a)<the compressive hardness (b)<the compressive hardness (d).

6. The foam according to claim 5, wherein the apparent density of the foam is 0.015 to 0.033 g/cm3.

7. The foam according to claim 1, wherein the apparent density of the foam is 0.015 to 0.033 $g/cm^3$.

* * * * *